United States Patent Office 2,907,739
Patented Oct. 6, 1959

2,907,739

NATURAL RESIN ACID ESTERS 4,4-BIS(4-HYDROXYARYL) PENTANOIC ACID

Sylvan O. Greenlee, Racine, Wis., assignor to S. C. Johnson & Son, Inc., Racine, Wis.

No Drawing. Application June 30, 1955
Serial No. 519,678

7 Claims. (Cl. 260—24)

This invention relates to new compositions prepared from polymeric polyhydric phenols and natural resin acids and more particularly concerns new compositions prepared by esterifying with natural resin acids the phenolic hydroxyl groups of a polyhydric phenol derived by self-esterifying an aryloxy-substituted acid.

An object of this invention is to provide new compositions from natural resin acids and self-esters of aryloxy substituted acids which are valuable compositions in the manufacture of coating materials, molding resins, adhesives, etc.

Another object of this invention is to provide new compositions of the hereinbefore described character which may be prepared with relatively high melting points and which are valuable in the manufacture of polymerized complex products having unusual chemical resistance, hardness, and gloss.

These and other objects and advantages are attained by the present invention, various novel features of which will become more fully apparent from the following description with particular reference to specific examples which are to be considered as illustrative only.

Natural resin esters of polyhydric alcohols have long been used in the formulation of coating compositions as well as a partial ingredient of certain molding and adhesive formulations. The natural resin esters generally have relatively high melting points, and are valuable in that they usually give better chemical resistance and greater hardness to films and molded objects prepared from compositions incorporating the natural resin esters. It has now been found that unusually high melting natural resin esters may be prepared by esterifying with natural resin acids the polymeric polyhydric phenols which are the self-esters of hydroxyaryl-substituted acids. Whereas most natural resin esters of the so-called ester gum type used by industry in present day formulations have softening points ranging from 80 to 130° C., it has been found that natural resin esters of these polymeric polyhydric phenols having softening points as high as 160 or 175° C. may be readily prepared. (Softening points as used herein were obtained by Durrans' Mercury Method, Journal of Oil and Colour Chemists' Association, 12, 173–175 [1929].)

These high melting products may be obtained without the necessity of modifying the product with other complexing agents. Maleic anhydride, for example, is often used in elevating the softening points of natural resin esters of the commercial ester gum type, the maleic anhydride combining with the natural resin acid structure through its double bond and in addition furnishing two extra carboxyl groups to combine with available hydroxyl groups.

With the high melting resin esters of the present invention, it is possible to use considerably smaller quantities of resin in formulating a composition such as may be used for a protective coating than are required using the lower melting, commercial ester gum type resins presently available, and still obtain equivalent hardness and gloss in the finished coating product. It is generally known, of course, that with an increased softening point for a given type of resin, the solubility becomes somewhat more limited, so that the high melting resin esters of the present invention are somewhat more insoluble in, for example, drying oils or hydrocarbon solvents than are the lower melting commercial ester gum types. The solubility in drying oils and solvent is, however, sufficient to enable the formulator to satisfactorily use them in the preparation of coating materials, molding resins, and adhesives.

The polymeric polyhydric phenols employed in this invention are compositions such as those disclosed in the copending Greenlee application, filed June 9, 1955, and having Serial Number 514,377, entitled "Resinous Polyhydric Phenols." These materials, having controlled physical characteristics are the self-esters derived from an hydroxyaryl-substituted aliphatic acid. Such compositions may be prepared, for example, by heating 4,4-bis(4-hydroxyphenyl)-pentanoic acid in the presence of acetic anhydride, as illustrated by the following:

(I)
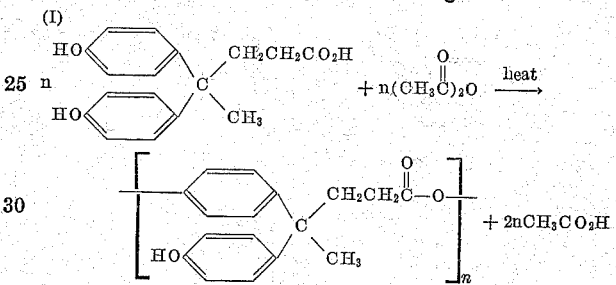

It is to be understood that the product of the illustrative reaction is only one of a mixture of materials actually produced. Further valuable variations in the type of composition obtained may be effected by varying the number of carboxyl groups esterified, resulting in resinous polyhydric phenols containing a desired amount of unreacted carboxylic acid. To illustrate this type of composition, the reaction between 2 molecules of 4,4-bis(4-hydroxyphenyl)-pentanoic acid results in an essentially resinous triphenolic acid:

(II)
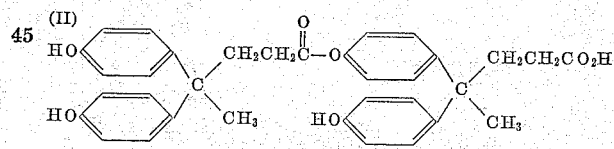

The hydroxyaryl-substituted acid contemplated for use in preparing the desired resinous polyhydric phenols have two hydroxyphenyl groups attached to a single carbon atom. The preparation of these substituted acids may be most conveniently carried out by condensing a keto-acid with the desired phenol. Experience in the preparation of bisphenols and related compounds indicates that the carbonyl group of the keto-acid must be located next to a terminal carbon atom in order to obtain satisfactory yields. Terminal carbon atoms as used herein refer to primary carbon atoms other then the carboxyl carbon atom of the keto-acid. Prior applications Serial Nos. 464,607 and 489,300, filed October 25, 1954, and February 18, 1955, respectively, disclose a number of illustrative compounds suitable for use as the hydroxyaryl-substituted acid, and methods of preparing the same. These materials, which are referred to, for convenience, as Diphenolic Acid, or DPA, consist of the condensation products of levulinic acid and phenol, substituted phenols, or mixtures thereof. It is to be understood that the phenolic nuclei of the Diphenolic Acid may be substituted with any groups which will not interfere with the esterification reactions. For example, the nuclei may be alkylated with alkyl groups of from 1 to 5 carbon atoms as disclosed in my copending application Serial No. 489,300 or they may be halogenated.

The resinous polyhydric phenols are prepared by self-esterification of the phenolic hydroxyl groups of the Diphenolic Acid with the carboxyl group of other molecules of Diphenolic Acid. This esterification may be conveniently carried out by heating the Diphenolic Acid in the presence of acetic anhydride in an amount equivalent to the extent of the esterification desired. For example, if it is desired to self-esterify approximately one-half the carboxyl groups to obtain a product as represented by II above, one-half mol of acetic anhydride per mol of Diphenolic Acid should be used. The reaction mixture may then be heated at temperatures of from about 190–275° C. under conditions whereby water of esterification is removed, to obtain the desired product. Water may be removed by bubbling inert gas through the reaction mixture during esterification, or by azeotropic distillation with a hydrocarbon solvent. If approximately complete self-esterification of the carboxyl groups is desired, at least 1 mol of acetic anhydride per mol of Diphenolic Acid should be used. Where more than the equivalent amount of acetic anhydride is used in the process, a portion of the phenolic hydroxyl groups not esterified by the carboxyl group of the Diphenolic Acid are acetylated. In some cases, it is desirable that a portion or even all of the phenolic hydroxyl groups not used in self-esterification be acetylated since the acetates are valuable in acid replacement reactions with natural resin acids to form the compositions of this invention. For example, 1 mol of a Diphenolic Acid might be treated with at least 2 mols of acetic anhydride to give approximately complete self-esterification and also acetylation of the excess phenolic hydroxyl groups.

The polymeric polyhydric phenols may also be prepared by converting the carboxyl group of the Diphenolic Acid to an acid chloride which immediately reacts with the phenolic hydroxyl groups of the Diphenolic Acid. This reaction results in the liberation of HCl and takes place immediately upon conversion of the carboxyl group to the acid chloride. Partial esterification of the carboxyl groups of the Diphenolic Acid may be effected by regulating the amount of acid chloride-forming reagent used in treatment of the Diphenolic Acid.

These polymeric polyhydric phenols, when esterified with natural resin acids, form the relatively high melting resin compositions which are the subject of this invention. The natural resin acids which may be used include commercial grades of rosin, and other natural occurring acid resins such as the kauri, copal, damar, and Congo gums.

Typically, the commercial grades of rosin have acid values of about 150–175. The acid values of typical damar gums are approximately 18 to 60, while the acid values of the kauri gums and copal gums are generally 60 to 80, and 105–130, respectively. The essential composition of all these natural-occurring resin acids is based on cyclic, terpenic acid structures of which abietic acid is fairly typical.

Esterification of the phenolic hydroxyl groups of the polymeric polyhydric phenols may be carried out by any of several methods which are generally known. A convenient method of preparing the resin acid esters consists of carrying out esterification in the presence of acetic anhydride in an amount equivalent to the carboxylic acid content to be esterified, in which case mixed anhydrides of acetic acid and the resin acid are formed in the process, or the acetates of the phenolic hydroxyl groups are formed so that on the application of heat at temperatures above the boiling point of acetic acid, the resin acid esters of the phenols are formed as acetic acid is displaced and removed by distillation. The esterification of the polymeric polyhydric phenols with these natural resin acids may be illustrated by the following equation where a polymeric polyhydric phenol is reacted with abietic acid in the presence of acetic anhydride:

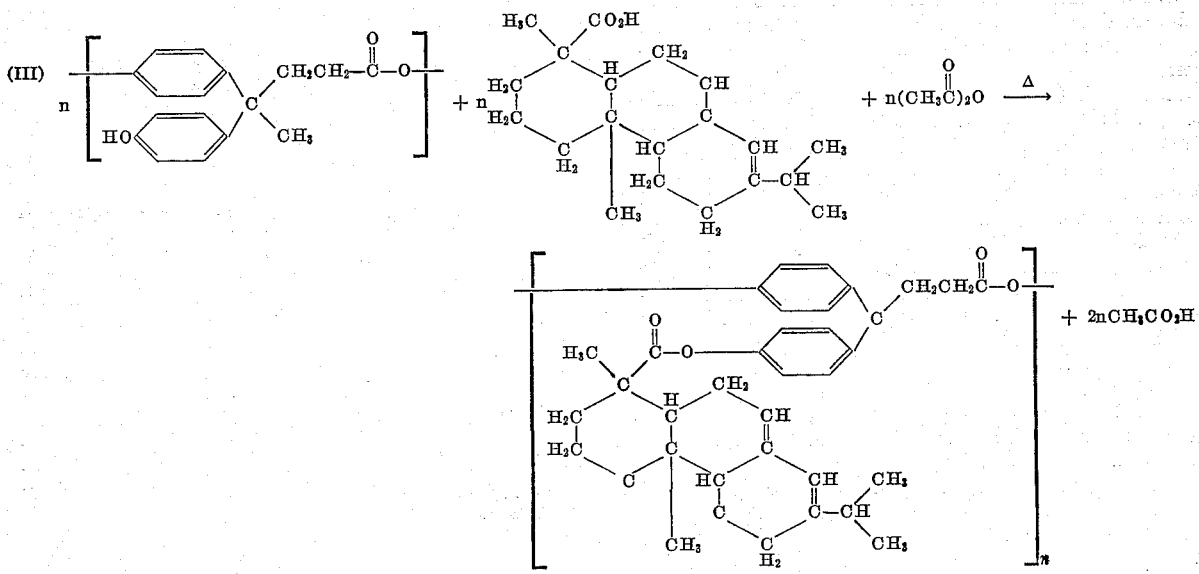

Alternatively, the natural resin esters of this invention may be prepared by first forming the acetates of the polymeric polyhydric phenols by treatment with acetic anhydride before adding the resin acids for acetic acid displacement. In still other cases the acid groups of the natural resin acids may first be converted to acid chlorides, and the chloride of the natural resin acid reacted directly with the phenolic hydroxyl groups of the polymeric polyhydric phenols to form the compositions of this invention with the liberation of HCl as esterification proceeds.

In many instances, it may be desirable to prepare the synthetic high melting resins of this invention by reacting directly mixtures of the Diphenolic Acid and the natural resin acids in the presence of acetic anhydride in an amount equivalent to the total carboxylic acid content of the Diphenolic Acid and the natural resin acid. Using this procedure, self-esterification of the Diphenolic Acid and esterification by the natural resin acids occur simultaneously. Using this procedure, mixed reaction products are obtained since undoubtedly some hydroxyl groups are never esterified or the two phenolic hydroxyl groups of the Diphenolic Acid molecule may both be esterified by either the carboxyl groups of natural resin acids, or by carboxyl groups of other Diphenolic Acid molecule, or the phenolic hydroxyl groups of the Diphenolic Acid molecule may be esterified by the carboxyl groups of both these acids to form a polymeric material as represented by III above. In Equation III, $n$ may represent any integer greater than 1, however, as a practical consideration it should be noted that those natural resin acid esters having less than about 15 monomeric units are the most valuable, since more highly polymerized products tend to be insoluble and infusible.

The synthetic compositions of this invention are novel compositions having incorporated within them the residues of natural resin acids. Products manufactured from these high-melting natural resin esters exhibit unusually good chemical resistance as well as hardness and relatively high gloss. These properties make the compositions of this invention particularly well suited for the manufacture of such products as coatings, molded articles, and adhesives.

The following examples will serve to further illustrate this invention, however, it should be understood that the invention is not intended to be limited thereby. In the examples, proportions expressed are parts by weight unless otherwise indicated.

Example I illustrates the preparation of a typical natural resin acid ester using rosin and a polymeric polyhydric phenol of 4,4 - bis(4 - hydroxyphenyl)-pentanoic acid. In this example the procedure used was to simultaneously react a mixture of the diphenolic acid and the resin together in the presence of acetic anhydride in an amount greater than that equivalent to the carboxylic acid content of the reaction mixture. Alternatively, of course, the diphenolic acid could be first esterified in the presence of acetic anhydride, and the esterification of the remaining phenolic hydroxyl groups with natural resin acids be carried out on the preformed self-ester.

Example I

A mixture of 143 parts of an hydroxyaryl-substituted aliphatic acid (4,4-bis[4-hydroxyphenyl]-pentanoic acid) and 122 parts of acetic anhydride in a 2-neck flask provided with a thermometer, a mechanical agitator, and a reflux condenser was heated at 135° C. for a period of 1 hour. To this mixture 125 parts of a commercial grade of rosin having an acid value of 166 was added. The reflux condenser was then turned downward for collection of the distillate, and inert gas was introduced. The temperature of the continuously agitated mixture was raised to 220° C. over a period of 2 hours and maintained at 220–250° C. for 3 hours, during which time the displaced acetic acid was collected. The product had an acid value of 20 and a softening point of 161° C.

Examples II and III illustrate the preparation of hard, flexible films from natural resin acid esters. These films were prepared by heating varnish solutions having the compositions of this invention as the hard resin portion of the varnish, to form the cured complex reaction products.

Example II

A mixture of 7 parts of the product of Example I and 13 parts of dehydrated castor oil were heated in an open container at 240–260° C. for 30 minutes in an inert gas atmosphere. The product, when dissolved in xylene to 50% nonvolatile content, had a viscosity of A–8 (Gardner viscometer) and a color of 14 (Gardner-Holdt color scale). To this solution .03% cobalt drier (based on nonvolatile content) was added. Films were applied to glass panels using a .002" wet film applicator and baked at 150° C. for 30 minutes. Hard flexible films were obtained which were unaffected by boiling water for 3 hours and also by 5% aqueous caustic soda at room temperature for 30 minutes.

Example III

A mixture of 7 parts of the product of Example I and 13 parts of linseed oil were heated in an open container at 240–260° C. for 30 minutes in an inert gas atmosphere. The product, when dissolved in xylene to 50% nonvolatile content, had a viscosity of A–8 (Gardner viscosimeter) and a color of 14 (Gardner-Holdt color scale). To this solution .03% cobalt drier (based on nonvolatile content) was added. Films were applied to glass panels using a .002" wet film applicator and baked at 150° C. for 30 minutes. Hard, flexible films were obtained which were unaffected by boiling water for 3 hours and also by 5% aqueous caustic soda at room temperature for 6 hours.

While the examples have illustrated the compositions of this invention as they may be used in the preparation of protective coatings, it is obvious that other complex products which are insoluble and which are hard, flexible, and tack-free could also be similarly prepared. Other constituents such as fillers, pigments, etc., may be admixed with these natural resin acid esters to produce reaction products based on these natural resin acid esters having modified characteristics.

It should be appreciated that while there are above disclosed only a limited number of embodiments of this invention, it is possible to produce still other embodiments without departing from the inventive concept herein disclosed, and it is intended, therefore, to cover all modifications of the invention which would be apparent to one skilled in the art and that come within the scope of the appended claims.

It is claimed and desired to secure by Letters Patent:

1. A new synthetic composition comprising the ester of a polyhydric phenol and a compound selected from the group consisting of acid containing natural resins of trees and acids of such resins, said polyhydric phenol being a self-ester of a pentanoic acid consisting essentially of 4,4 bis (4-hydroxyaryl) pentanoic acid wherein the hydroxyaryl radical is a hydroxyphenyl radical and is free from substituents other than alkyl groups of from 1–5 carbon atoms.

2. The composition of claim 1 where the pentanoic acid consists essentially of 4,4 bis (4-hydroxyaryl) pentanoic acid wherein the hydroxyaryl radical is a hydroxyphenyl radical and is free from substituents other than alkyl groups of one carbon atom.

3. The composition of claim 1 wherein the pentanoic acid is 4,4 bis (4-hydroxyphenyl) pentanoic acid.

4. The composition of claim 3 wherein the natural resin acid is rosin.

5. The composition of claim 3 wherein the natural resin acid is abietic acid.

6. A method for preparing a new composition of matter which comprises esterifying a polyhydric phenol with a compound selected from the group consisting of acid containing natural resins of trees and acids of such resins, said polyhydric phenol being a self-ester of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

7. The method of claim 6 wherein the esterification is carried out in the presence of acetic anhydride.

References Cited in the file of this patent

UNITED STATES PATENTS

| | | |
|---|---|---|
| 1,923,321 | Meigs | Aug. 22, 1933 |
| 2,099,510 | Bucy et al. | Nov. 16, 1937 |
| 2,116,084 | Saunders | May 3, 1938 |

OTHER REFERENCES

Carothers: Collected Papers of Wallace H. Carothers on Polymerization, pages 86–87, vol. I, Interscience (1940). Copy in Scientific Library. Div. 60.

UNITED STATES PATENT OFFICE
Certificate of Correction

Patent No. 2,907,739                                                      October 6, 1959

Sylvan O. Greenlee

It is hereby certified that error appears in the printed specification of the above numbered patent requiring correction and that the said Letters Patent should read as corrected below.

Columns 3 and 4, lower right-hand portion of formula (III) should appear as shown below instead of as in the patent:

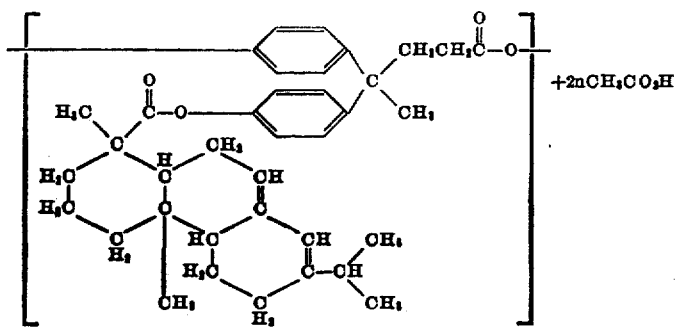

column 5, lines 26 and 30, for "diphenolic acid", each occurrence, read —Diphenolic Acid—.

Signed and sealed this 28th day of June 1960.

[SEAL]

Attest:
KARL H. AXLINE,
*Attesting Officer.*

ROBERT C. WATSON,
*Commissioner of Patents.*